(12) United States Patent
Matsumura

(10) Patent No.: US 10,355,465 B2
(45) Date of Patent: Jul. 16, 2019

(54) REDUCED HEIGHT RELAY BLOCK FOR VEHICLE POWER DISTRIBUTION DEVICE

(71) Applicant: SUMITOMO WIRING SYSTEMS, LTD., Yokkaichi, Mie (JP)

(72) Inventor: Akihiro Max Matsumura, Farmington Hills, MI (US)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 308 days.

(21) Appl. No.: 14/880,682

(22) Filed: Oct. 12, 2015

(65) Prior Publication Data

US 2017/0103864 A1    Apr. 13, 2017

(51) Int. Cl.
*H01H 85/20* (2006.01)
*H02G 3/08* (2006.01)
*B60R 16/023* (2006.01)

(52) U.S. Cl.
CPC ......... *H02G 3/086* (2013.01); *B60R 16/0238* (2013.01); *H01H 2085/208* (2013.01); *H01H 2085/209* (2013.01)

(58) Field of Classification Search
CPC ............... H02G 3/086; B60R 16/0238; H01H 2085/208; H01H 2085/2085; H01H 2085/209
USPC ............... 337/189; 361/627–630, 642, 819, 361/833–834
See application file for complete search history.

(56) References Cited

U.S. PATENT DOCUMENTS

| | | | |
|---|---|---|---|
| 5,764,487 A * | 6/1998 | Natsume | B60R 16/0238 174/72 B |
| 5,822,189 A | 10/1998 | Isshiki | |
| 6,022,247 A * | 2/2000 | Akiyama | B60R 16/0238 439/701 |
| 7,893,364 B2 | 2/2011 | Oda | |
| 2001/0027060 A1* | 10/2001 | Kondo | H01H 85/24 439/620.27 |
| 2001/0049211 A1* | 12/2001 | Sumida | B60R 16/0238 439/76.2 |

(Continued)

FOREIGN PATENT DOCUMENTS

| | | |
|---|---|---|
| JP | 2004080966 A | 3/2004 |
| JP | 2004096949 A | 3/2004 |

OTHER PUBLICATIONS

EPO machine translation of Miyamoto JP 2004080966.*
International Search Report and Written Opinion for Application No. PCT/US2016/ 056272 dated Jan. 10, 2017, 13 pages.

*Primary Examiner* — Jacob R Crum

(74) *Attorney, Agent, or Firm* — Reising Ethington, P.C.

(57) ABSTRACT

A reduced height relay block for use within a power distribution device for a vehicle electrical system. In one embodiment, there is provided a power distribution device that routes or distributes power throughout a vehicle electrical system and includes a lower housing, a relay block assembly, a module with a printed circuit board (PCB), an array of serviceable electrical components, and an upper cover. The relay block assembly includes a relay block with an upper side that is generally planar and includes a number of cavities for receiving the serviceable electrical components. An underside of the upper cover includes clearance ribs specifically designed to oppose certain serviceable electrical components and prevent them from backing out of their respective cavities.

13 Claims, 4 Drawing Sheets

(56) References Cited

U.S. PATENT DOCUMENTS

| | | | | |
|---|---|---|---|---|
| 2002/0025700 A1* | 2/2002 | Higashida | .......... | H01H 85/2045 439/76.2 |
| 2003/0231482 A1* | 12/2003 | Naimi | ................. | B60R 16/0238 361/833 |
| 2004/0021547 A1* | 2/2004 | Vicenza | .............. | B60R 16/0238 337/186 |
| 2011/0299229 A1* | 12/2011 | De la Reza | ......... | B60R 16/0238 361/624 |

* cited by examiner

REDUCED HEIGHT RELAY BLOCK FOR VEHICLE POWER DISTRIBUTION DEVICE

FIELD

The present invention relates generally to a power distribution device for a vehicle electrical system and, more particularly, to a relay block within the power distribution device.

BACKGROUND

There are various types of power distribution devices used in vehicle electrical systems, some of these devices are referred to as power distribution boxes, electrical connection boxes, power centers, etc. A power distribution device distributes low voltage battery power to various accessories and devices within a vehicle electrical system. In many traditional power distribution device designs, the device includes a relay block having a large number of cavities that differ in terms of size and shape and accommodate various relays, fuses and other serviceable electric devices.

An example of such a relay block can be seen in FIGS. 1-3, where the relay block 10 is molded from an insulating plastic material and includes various cavities or wells 20, 26, 30 designed to accommodate different types of electrical components. For example, cavities 20 are designed to receive smaller relays 22, whereas some of the other larger or deeper cavities 26, 30 may accommodate electric components of different sizes and shapes, like certain high current fuses 28 or other serviceable electric components 32. In general, the relay block 10 is configured so that once the electric components 22, 28, 32 are inserted and installed within the relay block, the top surfaces of the components are aligned and generally terminate in a common plane x'. Such a configuration, referred to herein as a "component aligned design," can make manufacturing a corresponding cover quite easy, as the cover can simply be a flat housing that closely fits over the relay block 10 such that it is in close proximity to the top surfaces of the electric components 22, 28, 32 which are in a common plane x'. A potential drawback, however, to a component aligned design like this is that it increases the average height H' of the relay block 10.

To explain, consider the three different sections or portions 40-44 of the relay block 10 that are illustrated in FIG. 3. The section 40 includes a number of smaller size cavities 20 that accommodate relays 22 which are smaller than the fuses 28. The section 42, on the other hand, includes a number of medium size cavities 26 that are deeper than cavities 20 and receive fuses 28, which are taller than relays 22. The tops or openings to cavities 26 could be on the same plane as those of cavities 20, but then the upper surfaces of fuses 28 would not be aligned with the upper surfaces of relays 22 in a common plane, as is required with "component aligned designs." The section 44 includes a deep cavity 30 in order to accommodate a large serviceable electric component 32 which protrudes out of the upper surface. Despite the electric components 22, 28, 32 having varying heights, all of their top surfaces generally terminate in a common plane x' due to the staggered cavity nature of a component aligned design, which is intentional. The component aligned design is certain advantages, but it does tend to increase the overall height H' of the relay block 10.

Those skilled in the art will appreciate that due to packaging and other dimensional constraints, as well as efforts to reduce the overall weight and cost of vehicle components, it may be desirable to provide a relay block for a power distribution device that has a reduced average height.

SUMMARY

According to one potential embodiment, there is provided a relay block assembly for use in a power distribution device that is part of a vehicle electrical system. The relay block assembly may comprise: a housing; a relay block installed within the housing and having a plurality of cavities; a plurality of current limiting electrical components installed in the plurality of cavities; and an upper cover fitted onto the housing and having an underside and at least one clearance rib, wherein the clearance rib projects from the underside of the upper cover so that it closely opposes a top surface of one or more of the current limiting electrical components.

According to another potential embodiment, there is provided a relay block assembly for use in a power distribution device that is part of a vehicle electrical system. The relay block assembly may comprise: a housing; a relay block installed within the housing and having an upper side, a lower side, a first plurality of cavities each with a first depth $D_1$, and a second plurality of cavities each with a second depth $D_2$, the first and second pluralities of cavities extend from the upper side of the relay block such that the first depth $D_1$ and the second depth $D_2$ are different; a first plurality of current limiting electrical components installed in the first plurality of cavities and a second plurality of current limiting electrical components installed in the second plurality of cavities; and an upper cover fitted onto the housing, wherein the relay block is configured according to a block aligned design such that the first and second pluralities of cavities all have openings aligned in a common plane that corresponds with the upper side of the relay block.

DRAWINGS

Preferred exemplary embodiments of the invention will hereinafter be described in conjunction with the appended drawings, wherein like designations denote like elements, and wherein.

DESCRIPTION

Figure 4:
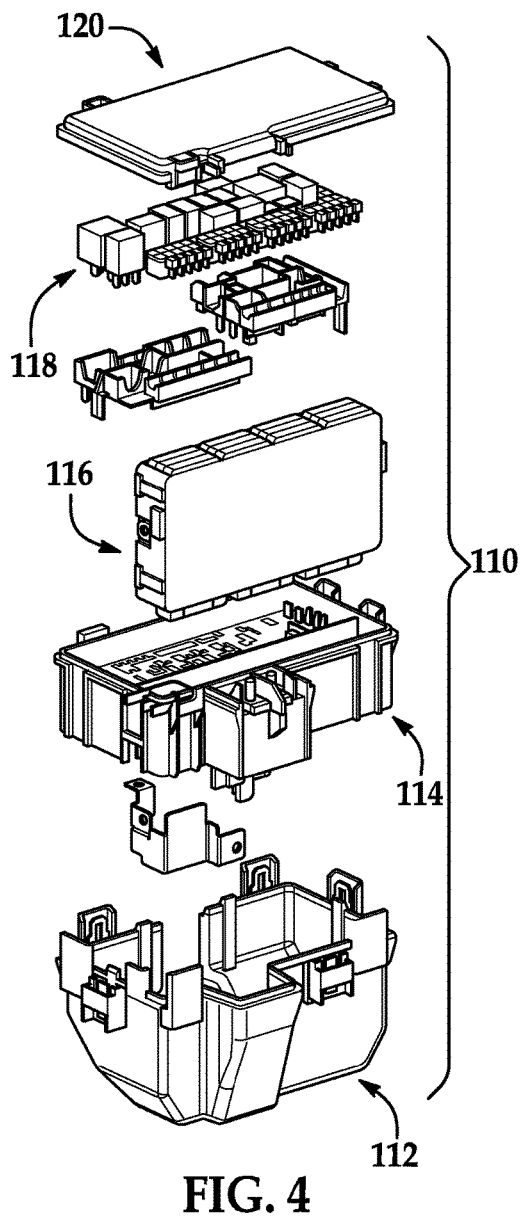
FIG. 4 is an exploded perspective view of an exemplary power distribution device.

There is described herein a reduced height relay block for use within a power distribution device for a vehicle electrical system. With reference to FIG. 4, there is shown a power distribution device 110 that routes or distributes power throughout a vehicle electrical system and generally includes a lower housing 112, a relay block assembly 114, a module 116 with a printed circuit board (PCB), an array of relays, fuses and other serviceable electrical components 118, and an upper cover 120.

The following description is directed to different embodiments and features of a relay block (part of the relay block assembly 114) and its role within the power distribution device 110. Because of its reduced height and low profile construction, the relay block described herein is particularly well suited for use with power distribution device designs that have stringent packaging or dimensional constraints, like a hybrid-type power distribution box (PDB) 110 that includes a relay block assembly 114 and a separate module 116 having its own printed circuit board (PCB). The relay block of the present application is also desirable for those applications where relay blocks are stacked and shipped unassembled to their place of assembly, as more relay blocks can be stacked and transported with each load when they have reduced heights. Those skilled in the art will appreciate that the reduced height relay block described herein may be used with any number of different types of power distribution devices and is not limited to the exemplary hybrid-type power distribution box (PDB) 110 shown here. The term "hybrid-type power distribution box," as used herein, broadly refers to a power distribution device in a vehicle electrical system that includes both a relay block assembly and a separate module all packaged into a single device. The relay block assembly 114 includes a collection of relays, fuses and/or other traditional electrical components, while the module 116 has its own PCB and is sometimes referred to as a relay module.

Figure 5:
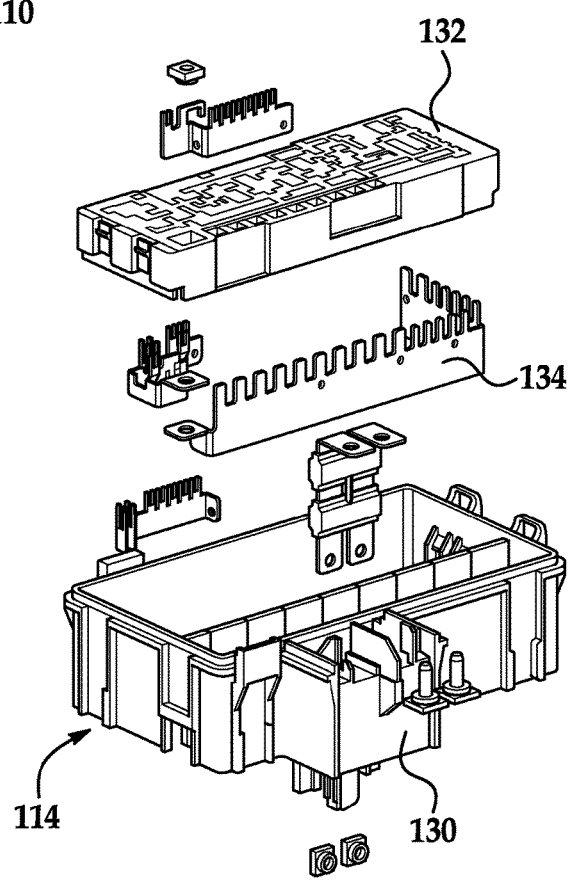
FIG. 5 is an exploded perspective view of an exemplary relay block assembly that may be used with the power distribution device of FIG. 4.

The relay block assembly 114 is further shown in exploded view in FIG. 5, and generally includes a relay block lower housing 130, an embodiment of the present relay block 132, a relay block bus bar 134, as well as a number of other components used for proper assembly and connection. It is envisioned that the relay block assembly 114 will be assembled or at least partially assembled first, before being installed in between the lower housing 112 and upper cover 120 with the other parts of the power distribution box (PDB) 110. Reducing the average height H of the relay block 132 is an objective of the present "block aligned design," as will be described in more detail.

Figure 1:
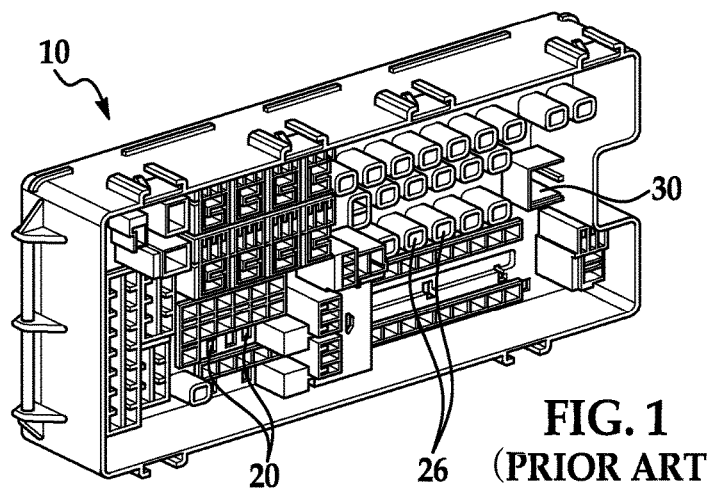
FIGS. 1 and 2 are perspective views of a traditional relay block for a vehicle power distribution device.
Figure 2:
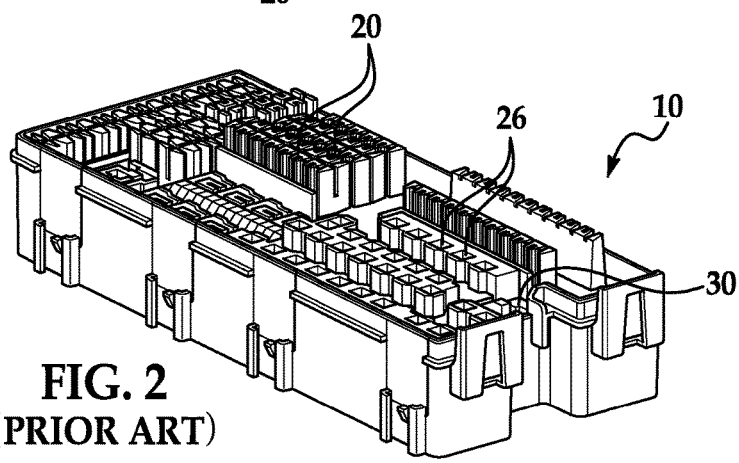
Figure 3:
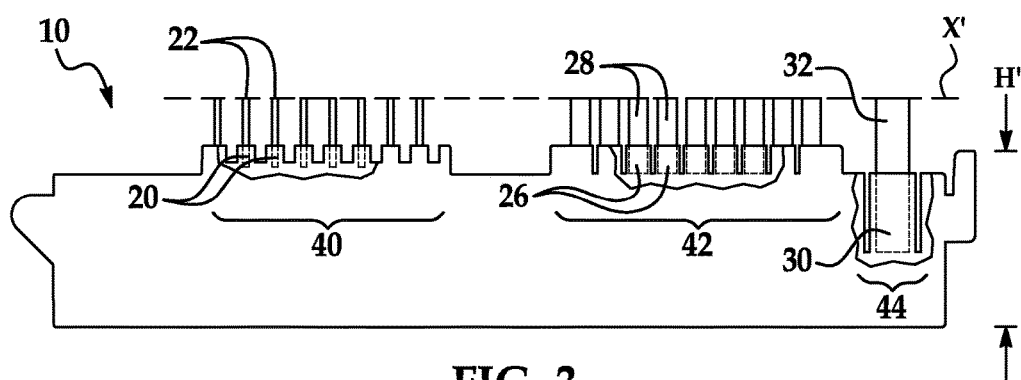
FIG. 3 is a partial cut away view of the traditional relay block of FIG. 2.
Figure 6:
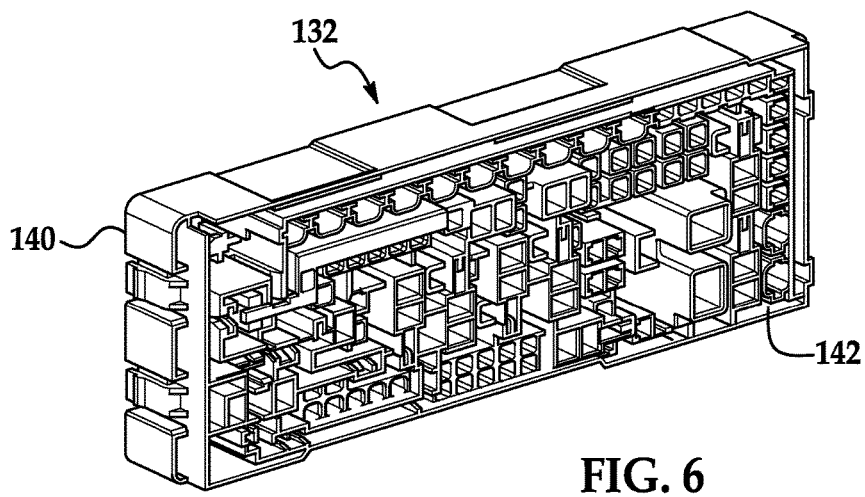
FIGS. 6 and 7 are perspective views of an exemplary relay block that may be used with the relay block assembly of FIG. 5.
Figure 7:
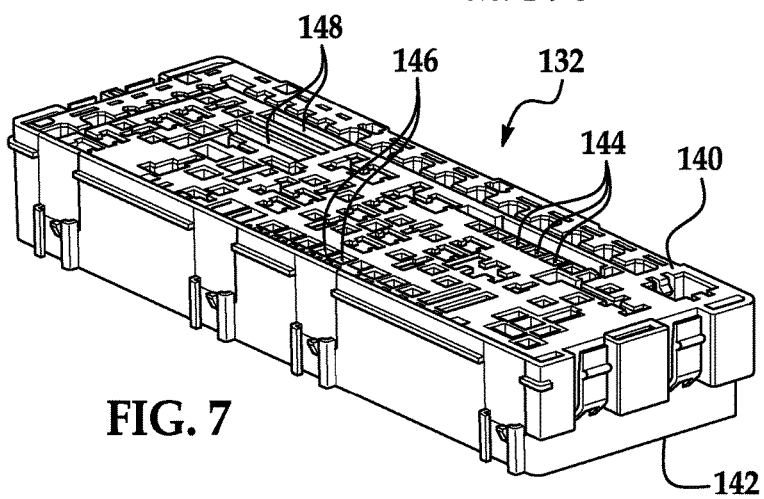
Figure 8:
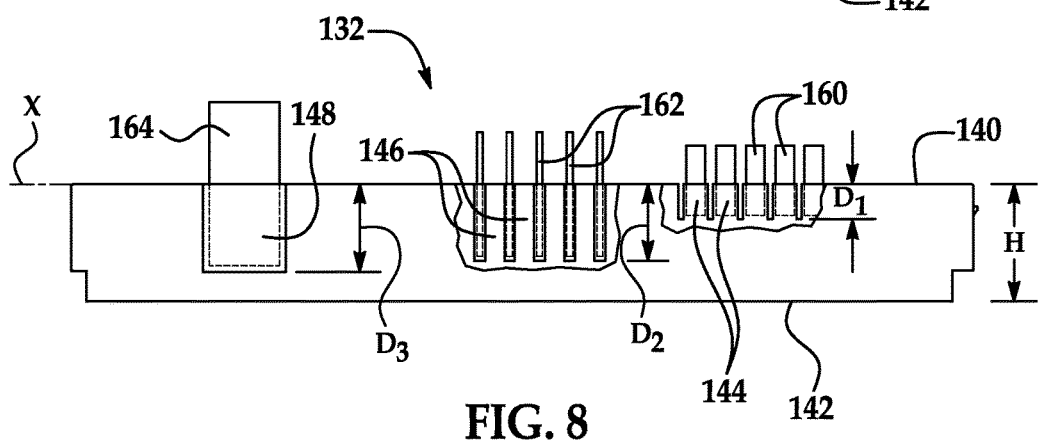
FIG. 8 is a partial cut away view of the relay block of FIG. 7.

Turning now to FIGS. 6-8, there is shown an example of a relay block 132 with a reduced height or profile that includes an upper side 140, a lower side 142, and a number of cavities 144, 146, 148 located therebetween, wherein the relay block has an average height H that is shorter than that of many traditional relay blocks, like relay block 10 in FIGS. 1-3. The relay block 132 is preferably a molded plastic component and can be formed from any number of suitable materials including, but not limited to, various glass filled grades of polyphthalamide (PPA) and/or polyethylene. Instead of being a "component aligned design," like relay block 10 of FIGS. 1-3 where the majority of the cavities 20, 26, 30 are positioned such that the upper surfaces of the components they receive are aligned in a common plane x', the relay block 132 has a "block aligned design." This means that the majority of the cavities 144, 146, 148 of the relay block 132 are positioned such that the top or opening of the cavities, as opposed to the top of the components, are generally aligned in a common plane x. This distinction can be seen when contrasting FIGS. 2 and 3 to FIGS. 7 and 8, respectively, as the upper side of the relay block 10 is not aligned in a common plane (FIG. 2) yet the upper surfaces of all of the installed components are aligned in a common plane x' (FIG. 3), whereas the upper side of the relay block 132 is aligned in a common plane x (FIG. 7) but the upper surfaces of the electrical components once they are installed are not aligned in a common plane (FIG. 8). These examples illustrate some of the differences between "component aligned designs" and "block aligned designs." In the block aligned design of relay block 132, the overwhelming majority of the cavities, no matter their size or shape, start at the upper side 140 and extend down into the relay block. It is not necessary that the top side 140 of the relay block 132 be perfectly planar, as it is shown in FIG. 7, but it is preferable.

Some of the cavities 144 of relay block 132 are smaller or shallower (depth $D_1$) and are designed to accommodate smaller electrical components, like relays 160. Such cavities may extend from the upper side 140 down into the relay block. Other cavities or wells 146 are larger and extend deeper into the relay block (depth $D_2$) so that they may receive larger electrical components, like fuses 162, while still other cavities 148 are the largest or deepest (depth $D_3$) and extend for nearly the entire height H of the relay block so that they can accommodate even larger serviceable electric devices 164. As illustrated in FIG. 8, the different electrical components that are installed into the relay block 132 have top surfaces that do not all terminate in any common plane, as they are staggered with component 164 protruding further or higher than components 160 and 162. Instead, the different cavities 144, 146, 148 all begin in a common plane x, namely the top surface 140 of the relay block, and extend down into the relay block, which is why the relay block 132 is considered a block aligned design. It is not required of a block aligned design for every cavity to be so aligned, so long as a significant majority of the cavities are aligned that way. It is worth noting that, in an effort to simplify FIGS. 3 and 8 by reducing overcrowding, only some of the possible current limiting electrical components (e.g., relays, fuses, etc.) have been shown, as many others would likely be installed in actual use.

Figure 9:
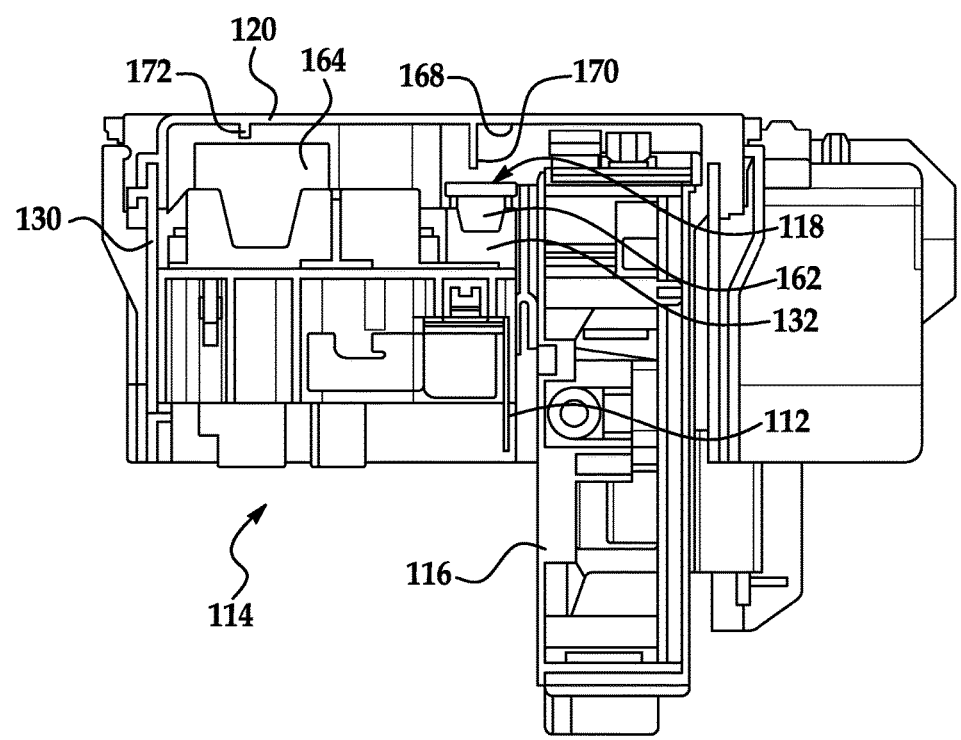
FIG. 9 is a cross-sectional view of the entire power distribution box of FIG. 1, which shows the relay block with a top cover installed.

With reference to FIG. 9, there is shown the relay block assembly 114 where an array of serviceable electrical components 118 (e.g., relays, fuses, etc.) are installed in a relay block 132; the relay block 132 along with the module 116 are mounted within a relay block lower housing 130; and the relay block assembly 114 is fitted with an upper cover 120. As explained above, in block aligned designs like relay block 132, the array of serviceable electrical components 118 are not intended to terminate in a common plane, as illustrated by the top surfaces of components 164 which are staggered and are higher than those of components 162. This creates larger spacings or gaps between the tops of components like relays 162 and the underside 168 of the upper cover 120. One reason why the upper cover is traditionally closely spaced to the tops of the relays and fuses is to avoid such spacing and to prevent them from backing out of their respective cavities over time. Another reason is to help detect an improper installation during manufacturing, as the top cover 120 will not fit onto the assembly if the electrical components are not fully inserted into their cavities. In order to address the increased spacing between the tops of components 118 and the underside of the upper cover 120 so that a block aligned design still enjoys the above-mentioned benefits of traditional designs, without having to manufacture a complex shaped upper cover, specifically designed clearance ribs 170, 172 have been selectively added to the underside 168 of the upper cover 120. These clearance or spacing ribs 170, 172 are integrally formed with the upper cover 120 and extend down into the cavities towards the components, thereby preventing them from backing out over time and also acting as a mis-installation warning in the event that they are not properly inserted into their respective cavities. It should be appreciated that a number of clearance ribs 170, 172 including ones with different sizes, orientations, etc. may be provided on the underside 168 of the upper cover 120 so that the top surfaces of most or all of the serviceable electrical components 118 are closely opposed by either the top cover 120 itself or a rib 170, 172 extending therefrom.

In the exemplary embodiment of FIG. 9, clearance rib 170 is longer than clearance rib 172 so that it projects further from the underside 168 of the upper cover 120. Both ribs 170, 172 are shown being parallel to one another, but this is not required as two or more ribs could be oriented so that they are perpendicular to one another as well. Clearance rib 170 is a single elongated rib that extends along a portion of the length the underside 168 of the upper cover 120 so that the single elongated rib opposes a number of different fuses or other current limiting electrical components that are lined up in a row (extends in direction going into or coming out of the page). In other embodiments, a clearance rib could be arranged to only oppose a single current limiting electrical component.

Figure 10:
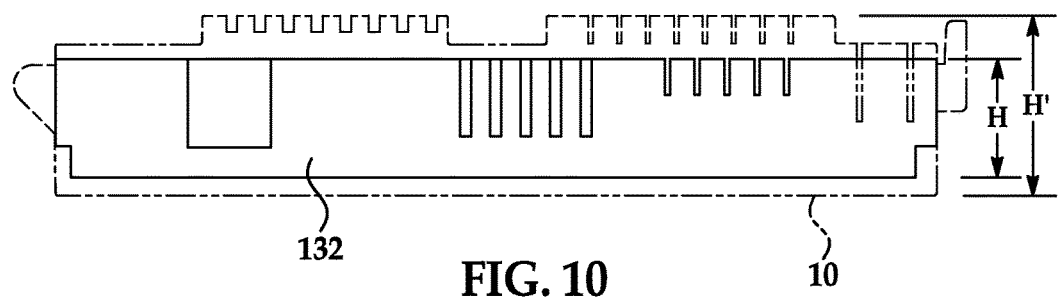
FIG. 10 is a comparative cross-sectional view of the relay block of FIG. 8 transposed on the traditional relay block of FIG. 3 so that the relative reduction in average height between the relay blocks can be appreciated.

FIG. 10 compares the average height H' of a prior art relay block 10 to the average height H of the relay block 132 described herein. In addition, it is illustrated that the overall height of the present relay block 132 is reduced by nearly 30% versus the overall height of the prior art relay block, even though both relay blocks accommodate the same number and combination of relays, fuses and other serviceable electrical components. The relay block 132 with its reduced height takes up less packaging space, which can be particularly useful when the relay blocks are being shipped unassembled and in large numbers to their final assembly destination and, thus, need to be stacked on top of each other. Other benefits to the reduced height will be apparent to those of ordinary skill in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A relay block assembly for use in a power distribution device that is part of a vehicle electrical system, comprising:
   a housing;
   a relay block being installed within the housing and having an upper side, a lower side, a first plurality of cavities each with a first depth D1, and a second plurality of cavities each with a second depth D2, the first and second pluralities of cavities extend from the upper side of the relay block such that the first depth D1 and the second depth D2 are different;
   a first plurality of current limiting electrical components and a second plurality of current limiting electrical components being installed in the first and second pluralities of cavities so that each of the current limiting electrical components is electrically connected to the relay block assembly, wherein the first plurality of current limiting electrical components are of a different height than the second plurality of current limiting electrical components; and
   an upper cover being fitted onto the housing and having an underside and at least one clearance rib, the clearance rib projects from the underside of the upper cover so that it closely opposes at least one current limiting electrical component and prevents the current limiting electrical component from backing out of its corresponding cavity;
   wherein the first and second pluralities of cavities have openings that are aligned in a common plane that corresponds with the upper side of the relay block so that the relay block has a block aligned design.

2. The relay block assembly of claim 1, wherein the upper side of the relay block is planar.

3. The relay block assembly of claim 1, wherein the relay block is a molded plastic component.

4. The relay block assembly of claim 1, wherein the plurality of current limiting electrical components include relays, fuses and other serviceable electrical components.

5. The relay block assembly of claim 1, wherein the upper cover includes a first clearance rib that projects from the underside of the upper cover and closely opposes a top surface of a first current limiting electrical component and a second clearance rib that projects from the underside of the upper cover and closely opposes a top surface of a second current limiting electrical component.

6. A relay block assembly for use in a power distribution device that is part of a vehicle electrical system, comprising:
   a housing;
   a relay block being installed within the housing and having an upper side, a lower side, a first plurality of cavities each with a first depth D1, and a second plurality of cavities each with a second depth D2, the first and second pluralities of cavities extend from the upper side of the relay block such that the first depth D1 and the second depth D2 are different;
   a first plurality of current limiting electrical components and a second plurality of current limiting electrical components being installed in the first and second pluralities of cavities so that each of the current limiting electrical components is electrically connected to the relay block assembly, wherein the first plurality of current limiting electrical components are of a different height than the second plurality of current limiting electrical components; and
   an upper cover being fitted onto the housing and having an underside, a first clearance rib, and a second clearance rib, the first and second clearance ribs project from the underside of the upper cover and closely oppose top surfaces of first and second current limiting electrical components so that the first and second current limiting electrical components are prevented from backing out of their corresponding cavities and becoming electrically disconnected from the relay block assembly;

wherein the first clearance rib is longer than the second clearance rib so that it projects further from the underside of the upper cover, and wherein the first and second pluralities of cavities have openings that are aligned in a common plane that corresponds with the upper side of the relay block.

7. The relay block assembly of claim 5, wherein the first clearance rib is aligned parallel to the second clearance rib.

8. The relay block assembly of claim 1, wherein the clearance rib is a single elongated rib that extends along a length or width of the underside of the upper cover so that the single elongated rib opposes a plurality of current limiting electrical components when the upper cover is fitted onto the relay block assembly.

9. The relay block assembly of claim 1, wherein the clearance rib projects from the underside of the upper cover so that it closely opposes a top surface of the at least one current limiting electrical component and prevents the upper cover from being fitted onto the relay block assembly if the current limiting electrical component is improperly installed during assembly.

10. The relay block assembly of claim 1, wherein the upper cover is a generally planar cover with the at least one clearance rib projecting from the underside.

11. The relay block assembly of claim 1, wherein the at least one clearance rib is an integrally molded feature of the upper cover.

12. A hybrid-type power distribution box (PDB) that includes the relay block assembly of claim 1 and a module having its own printed circuit board (PCB), wherein the relay block assembly and the module are generally installed in the PDB between the housing and the upper cover.

13. A relay block assembly for use in a power distribution device that is part of a vehicle electrical system, comprising:
    a housing;
    a relay block being installed within the housing and having an upper side, a lower side, a first plurality of cavities each with a first depth $D_1$, and a second plurality of cavities each with a second depth $D_2$, the first and second pluralities of cavities extend from the upper side of the relay block such that the first depth $D_1$ and the second depth $D_2$ are different;
    a first plurality of current limiting electrical components being installed in the first plurality of cavities and a second plurality of current limiting electrical components being installed in the second plurality of cavities so that each of the first and second pluralities of current limiting electrical components are electrically connected to the relay block assembly, wherein the first plurality of current limiting electrical components are of a different height than the second plurality of current limiting electrical components; and
    an upper cover being fitted onto the housing, wherein the upper side of the relay block is planar and the first and second pluralities of cavities all have openings aligned in a common plane that corresponds with the planar upper side of the relay block.

* * * * *